United States Patent
Kido

(12) 
(10) Patent No.: US 6,675,358 B1
(45) Date of Patent: Jan. 6, 2004

(54) FONT ACCESS, REGISTRATION, DISPLAY AND PRINTING METHOD AND A METHOD FOR PROCESSING ELECTRONIC DOCUMENTS HAVING VARIANT FONTS

(75) Inventor: Akio Kido, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/444,040

(22) Filed: Nov. 19, 1999

(30) Foreign Application Priority Data

Nov. 12, 1998 (JP) .......................... 10-321630

(51) Int. Cl.[7] ............................... G06F 3/14
(52) U.S. Cl. ..................... 715/542; 715/535; 715/536
(58) Field of Search ................. 715/542, 535, 715/536; 345/467, 471; 358/1.11; 400/61

(56) References Cited

U.S. PATENT DOCUMENTS

| | | | |
|---|---|---|---|
| 5,533,180 A | * 7/1996 | Zhou et al. | 715/542 |
| 5,802,538 A | * 9/1998 | Ooishi | 715/542 |
| 5,936,636 A | * 8/1999 | Gelfenbain | 345/467 |
| 5,940,581 A | * 8/1999 | Lipton | 358/1.11 |
| 6,073,148 A | * 6/2000 | Rowe et al. | 715/542 |
| 6,243,704 B1 | * 6/2001 | Ooishi | 707/10 |
| 6,377,966 B1 | * 4/2002 | Cooper et al. | 715/542 |
| 6,426,751 B1 | * 7/2002 | Patel et al. | 345/468 |

* cited by examiner

*Primary Examiner*—Sanjiv Shah
(74) *Attorney, Agent, or Firm*—Bracewell & Patterson LLP

(57) ABSTRACT

To provide a method for font access, a method for font registration, a method for font display, a method for font printing and a method for handling an electronic document in which a variant font is included, and a recording medium therefor, whereby the creator of an electronic document can use many more characters than those to which restricted by the conventional character codes. According to the method for font access, the method for font registration, the method for font display, the method for font printing, and the method for processing an electronic document in which a variant font is included, a variant font file is used that includes a variant font data file and an index conversion table having a primary index table and a secondary index table. Based on a character code and a variant character number of a regular character of a target variant font that is indexed in an electronic document; a pointer to a corresponding secondary index can be obtained from the character code of the regular code; the position of entry data of a secondary index in the secondary index table pointed to by the obtained pointer can be moved a distance equivalent to the variant character number; and a font image at the position of the pointer to the first byte of the target variant font can be obtained as the target variant font. Then a recording medium in acquired to record the electronic document in which the above described variant font is included.

15 Claims, 4 Drawing Sheets

FONT ACCESS, REGISTRATION, DISPLAY AND PRINTING METHOD AND A METHOD FOR PROCESSING ELECTRONIC DOCUMENTS HAVING VARIANT FONTS

BACKGROUND OF THE INVENTION

The present invention relates to a method for font access, registration, display and printing and a method for processing an electronic document in which is included a variant font, as well as to a recording medium therefor that facilitates the exchange of and the search for information among a plurality of information systems, and to the use of a variant font in an electronic document system.

For applications for census registration or client management, which involve the management of the names of persons and of areas, or for applications for the electronic documentation of the editions of classical works, there has been a strong demand for processes that will permit the handling of as many characters as possible. According to one method that has been devised in response to this demand, a conventional system, such as a word processor, is used, and the concept of "non-standard characters" or of "user defined characters" is introduced, so that in a user's environment characters unique to the user are prepared or used.

However, this method is used only in a closed environment wherein the non-standard characters or the user defined characters are used in common by a single user or a single company, and in an open environment, such as the Internet, the exchange of information concerning a document using such non-standard characters is not ensured. That is, in an environment wherein a user refers to an electronic document, a character that the writer of the document did not intend to use is displayed.

Further, a large problem has arisen concerning the conduct of a search for a document in which non-standard characters are used. For example, if in a document it is desired that the old Chinese character be used for "taka" in "takashima," i.e., if it is desired that be used, is defined as a non-standard character. In this case, the non-standard character can not be found by conducting a search using the regular character for "taka," i.e., the standard font. To search for both "taka" characters, either a logical OR must be used, or a thesaurus wherein character variant relationships are defined must be created and used for a fuzzy search. However, neither method is practical.

Specifically, in order to perform a search using a logical OR, a user must fully understand what non-standard characters are registered in the user's information system, and the relationship between those non-standard characters and standard characters. Furthermore, relative to the method involving the use of a thesaurus, since the user-defined characters are defined and used by user by user, characters included in a thesaurus will differ from a user to another, so that a user of a search system can not create a common thesaurus that is adequate for use by all other users.

To resolve the above shortcoming, a method has been devised whereby in a character code table all necessary characters are defined as standard characters, and whereby a thesaurus is created in which variant relationships are specified for the included defined characters. However, several hundred thousand, or an infinite number of characters may be required in order to define character codes so as to identify tiny differences in character styles, and if character codes including such an enormous number of characters were supported as standard character codes by all information systems, the attendant costs of the installations would have to be charged to all the users of the systems. For these reasons, the above described method is not practical. In addition, were a variant style thesaurus to be created for on the order of several hundred thousand Chinese characters, the size of the thesaurus would be too large, and search speeds would be reduced. Further, it would be substantially impossible to maintain such a thesaurus were the entry thereto of additional characters permitted.

The above described problems have arisen because a character coining function is prepared for Chinese character writing system. That is, for handwriting or for a normal edition for which a print character type is used, new character types are formed as needed, and a person may be expected to ignore tiny differences in the type, or kana characters may be entered alongside the newly created Chinese characters, so that the creator and a reader tacitly share in a relationship that exists between a regular character and a variant character. When the coining function of Chinese character writing system and the fuzzy reading function are carried out by an information system, a definition function to be used for non-standard characters is provided for a user, so that the coining function of Chinese character writing system can be implemented. However, the fuzzy reading function is ignored because the processing available with a conventional information system is too poor to adequately perform fuzzy image recognition, and because compared with the information required for the exchange of data when character codes are used, the amount of information required for the exchange of data when images are used is much larger.

As the Internet has become popular, the exchange of electronic information, whether among individuals or among companies, has become common. Before, since information was exchanged using media on which characters were printed, the reading of the characters was the responsibility of a user, and for an information system there was little need for a fuzzy reading function. However, at the present, now that generally electronic data are exchanged, and stored electronic data are searched for, a greater need has arisen for an increase in the standard characters that are specially defined for data exchange, for the exchange of character data for non-standard characters that have been coined, and for searches to be performed for those characters.

It is one object of the present invention to provide a method for font access, a method for font registration, a method for font display and a method for handling an electronic document in which a variant font is included, and a recording medium therefor, so that the creator of an electronic document can use many more characters than those to which restricted by the conventional character codes.

SUMMARY OF THE INVENTION

To achieve the above object, according to the present invention, provided is a method for font access that uses a variant font file, which is constituted by: a variant font data file consisting of image data of a variant font; and an index conversion table, which includes a primary index table consisting of character codes of regular characters and pointers for corresponding secondary indexes, a secondary index table including secondary index entry data consisting of a pointer to the first byte of a target font in the variant font data file and a pointer to the succeeding secondary index entry having the same primary index.

The method for using the variant font file is as follows. Based on a character code and a variant character number of a regular character of a target variant font that is indexed in an electronic document, the primary index table in the index conversion table is referred to; a pointer to a corresponding secondary index is obtained from the character code of the regular character; the position of entry data, relative to a secondary index in the secondary index table pointed to by the obtained pointer, is moved a distance equivalent to the variant character number; and a font image at the position pointed to by the pointer relative to the first byte of the target variant font is obtained as the target variant font.

Further, a font registration method according to the present invention comprises the steps of: sequentially adding and registering, in a variant font data file, font data in a variant font file that represents an image of a variant font to be added to a variant font data file selected by a user; regarding, as entry data of a secondary index, positional information of registered font data and the number of fonts having the same primary index number in the font file, and storing the positional information and the number of fonts in a secondary index table for an index conversion table; and storing, in a primary index table, a character code of a regular character defined by a user, and a pointer to a secondary index corresponding to the character code of the regular character.

Furthermore, according to a font display method of the present invention, when the character code of a regular character is entered by a user, first, a font library is searched and a font having the character code is displayed on a display device. At the same time, a variant font, in which is included the character code of the regular character, is obtained from a variant font file, which is constituted by a variant font data file including image data of a variant font, and an index conversion table that includes a primary index table in which are entered character codes of regular characters and pointers of corresponding secondary indexes, and a secondary index table in which is entered a secondary index entry data consisting of a pointer to the first byte of a target font in the variant font data file, and a pointer to the succeeding secondary index entry of data having the same primary index. Thereafter, the variant font is displayed on the display device.

According to a font printing method of the present invention, first, a font having a character code of a regular character is obtained from a font library and is printed. Then, a variant font file is used constituted by: a variant font data file consisting of image data of a variant font; and an index conversion table included in which are a primary index table consisting of character codes of regular characters and pointers to corresponding secondary indexes, and a secondary index table including secondary index entry data consisting of a pointer to the first byte of a target font in the variant font data file and a pointer to the succeeding secondary index entry having the same primary index. Based on a character code and a variant character number of a regular character in a target variant font that is indexed in an electronic document, the primary index table in the index conversion table is referred to. The pointer to the corresponding secondary index is obtained from the character code of the regular character, and the position of the entry data, relative to the secondary index in the secondary index table pointed to by the obtained pointer, is moved a distance equivalent to the variant character number. Then, a font image at the position of the pointer of the first byte of the target variant font is obtained and printed.

In the above described method for font access, method for font registration, method for font display and method for font printing, a method for embedding a variant font in an electronic document, a method for processing an electronic document having a variant font being embedded, and a method for searching for a character string in such an electronic document, are provided as a preferred method for handling an electronic document in which a variant font is included. Furthermore, a recording medium is provided for storing an electronic document in which a variant font used in the present invention and in its preferred implementation is indexed.

According to the above described method for font access, method for font registration, method for font display, method for font printing, and method for handling an electronic document in which is included a variant font, the creator of an electronic document can use many more characters (character styles) than those to which restricted by conventional character codes. Accordingly, the restriction placed on the number of characters that can be used for registration/management or for a client management application that manages the names of persons and areas, or for an application for the electronic documentation of the editions of classical works can be eliminated, and the names of persons and areas and the classes can be processed and stored using correct character styles. Further, information can be exchanged using an electronic document written in characters coined by a user. That is, a character having the same character style as one that is formed in the environment of a writer can be displayed in the environment of a recipient of an electronic document. Furthermore, a search can be conducted of an electronic document that uses a coined character. That is, a character string can be searched for without a regular character and a variant character being separated, or, as needed, a search of a character string can be conducted without a distinction being made between a regular character and a variant character.

As a preferred implementation, a variant font is embedded in an electronic document by using a character code in a local system, a character code as an in line font, or a URL indicating the character code of a font file in a remote system. In this case, when an electronic document processing system is used that satisfies the above requests by using conventional character code, installation costs can be reduced.

DESCRIPTION OF THE PREFERRED EMBODIMENTS

First, a method according to the present invention for indexing a variant font used in an electronic document will now be described. In the present invention, a variant font in an electronic document is designated by using the character code of a corresponding regular character, a variant font file name and a variant character number. Therefore, an indexed variant font has a two-dimensional index, while a normal font includes a one-dimensional index constituted by a font name and a character code. The two-dimensional index is converted into the positional information of a font in a font file by referring to an index conversion table, which will be described later, that is stored in the font file. It is preferable that the variant character number of a sub-index be a sequential font number that corresponds to the count of the fonts beginning at the head of the font data file in the font file of a target font, or a byte index that indicates the position of the first byte of the target font data.

The variant character number (sub-index) of the variant font is coded in the font name. The font name is composed of information describing a typeface, information describing a creator, and a variant character number, e.g., the structure of "MINCHO-ITAI@FOOBAR:2." In this case, "MINCHO-ITAI" is a typeface name, "@" is a delimiter separating the typeface and the creator information, "FOOBAR" is the creator information, ":" is a delimiter separating the creator information and the variant character number, and "2" is a variant character number. The variant font is designated by this font name and the character code of a regular character that succeeds the font name.

Figure 1:
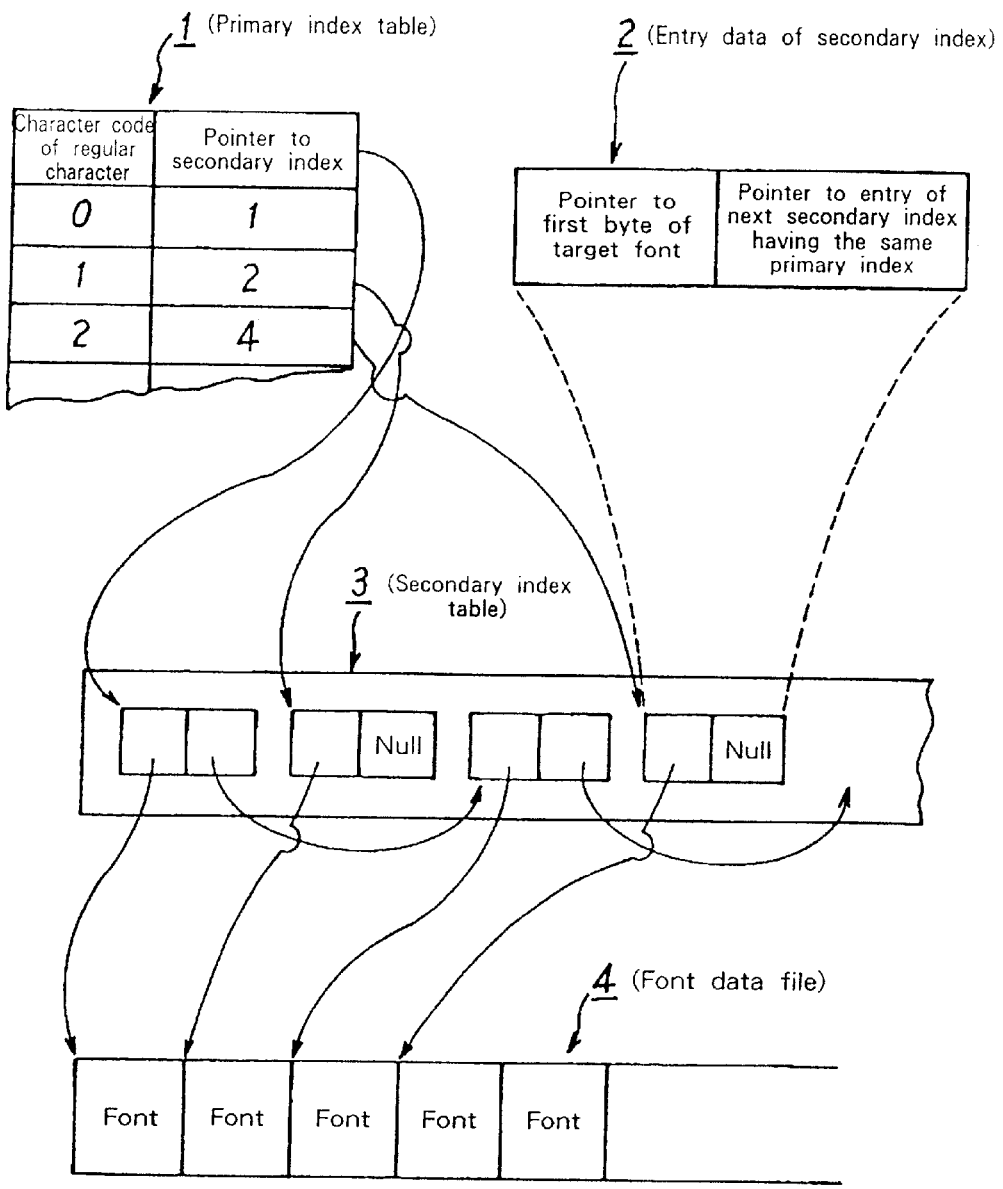
FIG. 1 is a diagram illustrating an example arrangement of an index conversion table of a variant font according to the present invention.
Figure 2:
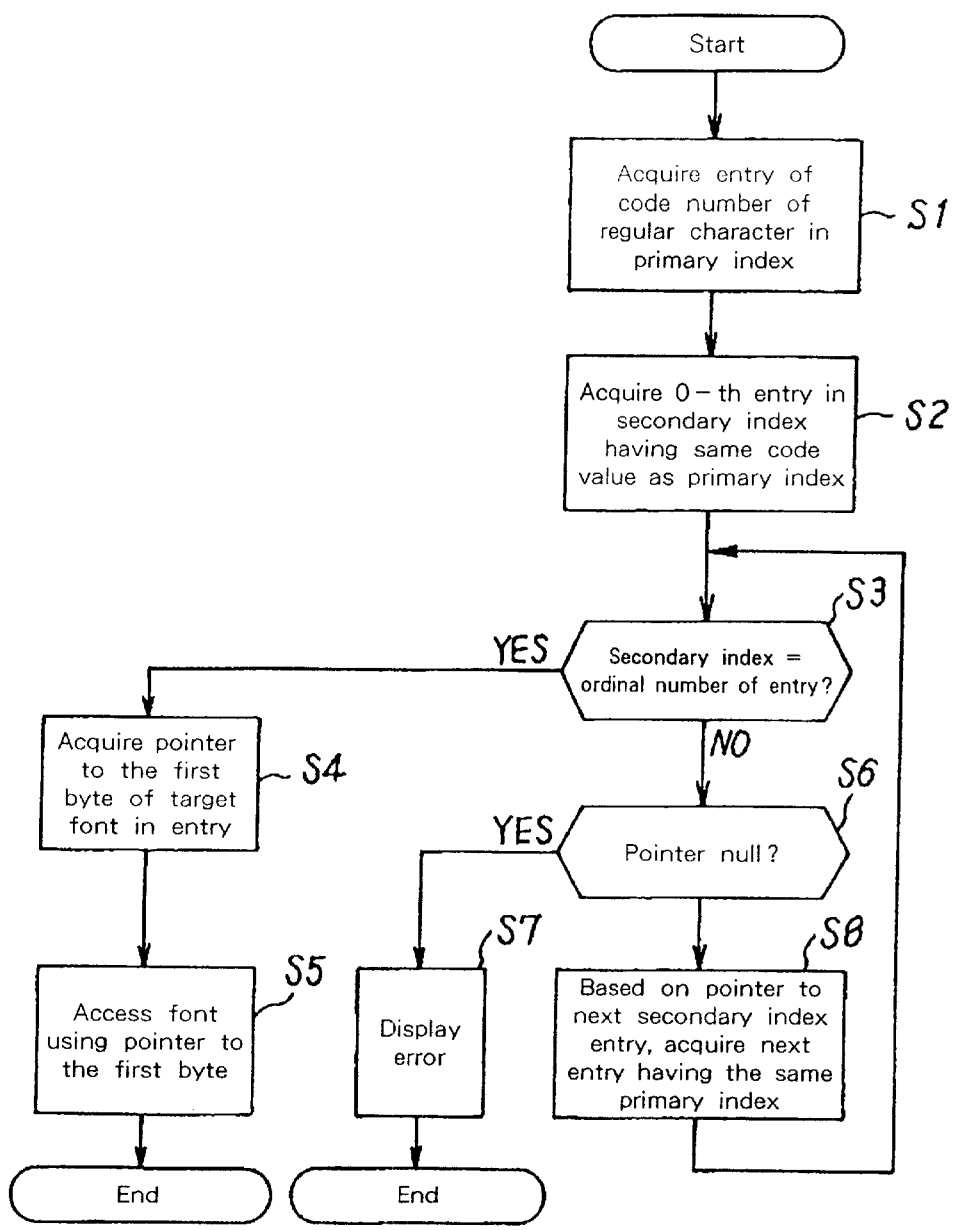
FIG. 2 is a flowchart for explaining the method used for indexing a variant font using the index conversion table shown in FIG. 1.

An explanation will now be given for a method used for indexing the thus described variant font by referring to an index conversion table. FIG. 1 is a diagram showing an example index conversion table of a variant font, and FIG. 2 is a flowchart for explaining the method used for indexing a variant font using the index conversion table in FIG. 1. In FIG. 1, the index conversion table is constituted by a primary index table 1 and a secondary index table 3. The primary index table 1 includes character codes of regular characters and pointers to corresponding secondary indexes. The secondary index table 3 includes entry data 2 for the secondary index, which consists of a pointer to the first byte of a target font in a variant font data file, and a pointer to a succeeding secondary index entry having the same primary index. A font data file 4 includes the variant fonts in a font file. The index conversion table is stored in the font file of each user to facilitate the identification of a font driver.

While referring to FIG. 2, an explanation will now be given for a method for indexing a variant font using the index conversion table in FIG. 1. First, the character code of a regular character is read from a variant font indexed in an electronic document, and an entry of the character code used in the primary index table 1 is obtained (S1). The contents of the entry are obtained by referring to the primary index table 1, and a printer for the secondary index table 3 is obtained therefrom (S2). The pointer for the secondary index table 3 is the 0-th entry of regular characters defined in the primary index of the variant font. Then, a target secondary index value that is represented by a variant number obtained from the sub-index of the variant font is compared with the ordinal number of the entry (S3). When the target secondary index value matches the ordinal number of the entry, the pointer to the first byte of the target font in the font data file 4 is obtained from the entry data 2 of the secondary index in the secondary index table 3 (S4). Then, the target font in the font data file is accessed using the pointer to the first byte and is displayed (S5).

If the target secondary index value does not match the ordinal number of the entry, a pointer to the secondary index entry having the same primary index is read from the entry data 2 of the secondary index, and a determination is made as to whether its value is a null (S6). When the value of the obtained pointer is a null, the next entry is not found, and an error message is displayed (S7). The processing is thereafter terminated. When the obtained pointer is not a null, the pointer to the entry of the obtained secondary index is accessed, and the next entry having the same primary index is obtained from that pointer (S8). Following this, the process following step 3 is repeated, and the indexing of the variant font is terminated. In the above example, the pointer to the first byte of the target font in the font data file 4 is used as the entry data 2 of the secondary index. However, a sequential font number consisting of the number of fonts beginning at the head of the font data file 4 can also be used.

Figure 3:
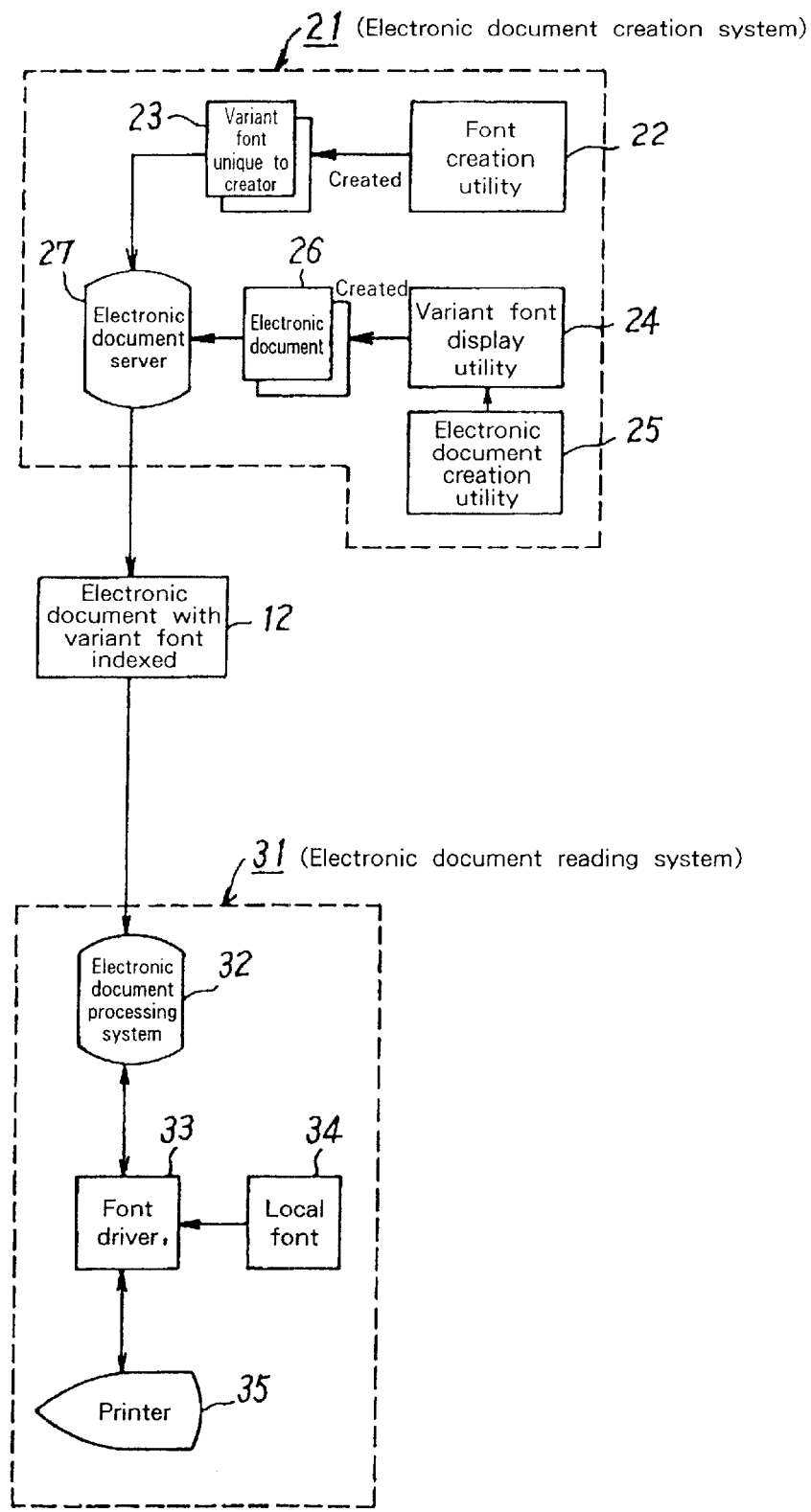
FIG. 3 is a diagram for explaining a method used by an electronic document processing system to process a variant font according to the present invention.

An explanation will now be given while referring to FIG. 3 for a system that performs the method of the present invention for performing the processing for an electronic document including a variant font. In FIG. 3, an electronic document processing system 11 comprises an electronic document creation system 21 for creating an electronic document, and an electronic document reading system 31 for reading an electronic document. In FIG. 3, when an electronic document prepared by the electronic document creation system 21 is to be read upon the reception of a request from the electronic document reading system 31, an electronic document is used for which a variant font in the above described structure is indexed.

The electronic document processing system 11 includes a font creation utility 22 for creating a variant font 12; a variant font file 23 which is unique to a creator of a variant font; a font display utility 24 used to prepare an electronic document including a variant font; an electronic document creation utility 25 such as a word processor; an electronic document file 26; and an electronic document server 27 for storing the variant font file 23 and the electronic document file 26. The electronic document reading system 31 includes an electronic document processing system 32 for reading an electronic document including a variant font, a font driver 33, a local font 34 and a printer 35.

An explanation will now be given for the variant font creation utility 23, the variant font display utility 24, and the font driver 33 for processing a variant font, in the electronic document processing system 11 in FIG. 3.

The variant font creation utility 23 adds a variant font having the above described structure to a font file (if there is no corresponding font file, it should be created) having the typeface name and a creator name that are entered by a user. The character style data of the variant font are supposed to be sequentially added to the font data file 4 of the font file. After character style data are registered, the variant font creation utility 23 adds a new entry to the index conversion table. The positional information of the registered character style data and the character code (primary index) of a corresponding regular character entered by a user, and the number of fonts having the same primary index in the font file are stored as a secondary index. The process can be performed by referring to the variant font index method by using the index conversion table.

The creator of the font data is responsible for the designation of the primary index of the variant font, as well as for the normal non-standard character creation utility. The created variant font is correlated with the regular character by the designation of the index, and this relationship is used for a search. Since this relationship is included as character code in an electronic document, a thesaurus for a fuzzy search need not be referred to. Further, since the relationship between a regular character and a variant character is defined by the creator of the variant character, differences in the results of a search of an electronic document, which are due to differences in how data is interpreted by the creator and a reader, do not occur.

The variant font display utility 24 receives the font name and the character code of a regular character entered by a user, searches the font library supported by the information system, and displays on the display device all the fonts having the same font name and having as their primary index the same character code primary index. Further, when by using a keyboard or a pointing device a user designates a specific font chosen from among the members of a font group shown on the display device, the font name of the corresponding font is returned to the user or to the program that calls the variant font display utility 24. In the preferred implementation of the present invention, the variant character display utility 24 is called by an input method editor (IME), such as one used for kana-kanji conversion. The IME returns to an application program, such as a word processor, that calls the IME the variant font of the present invention consisting of the primary index (the font name and the character code of a regular character) and the secondary index (a variant character number), so that the application can embed, in an electronic document, the font information of a designated variant font and the character code of a regular character.

Figure 4:
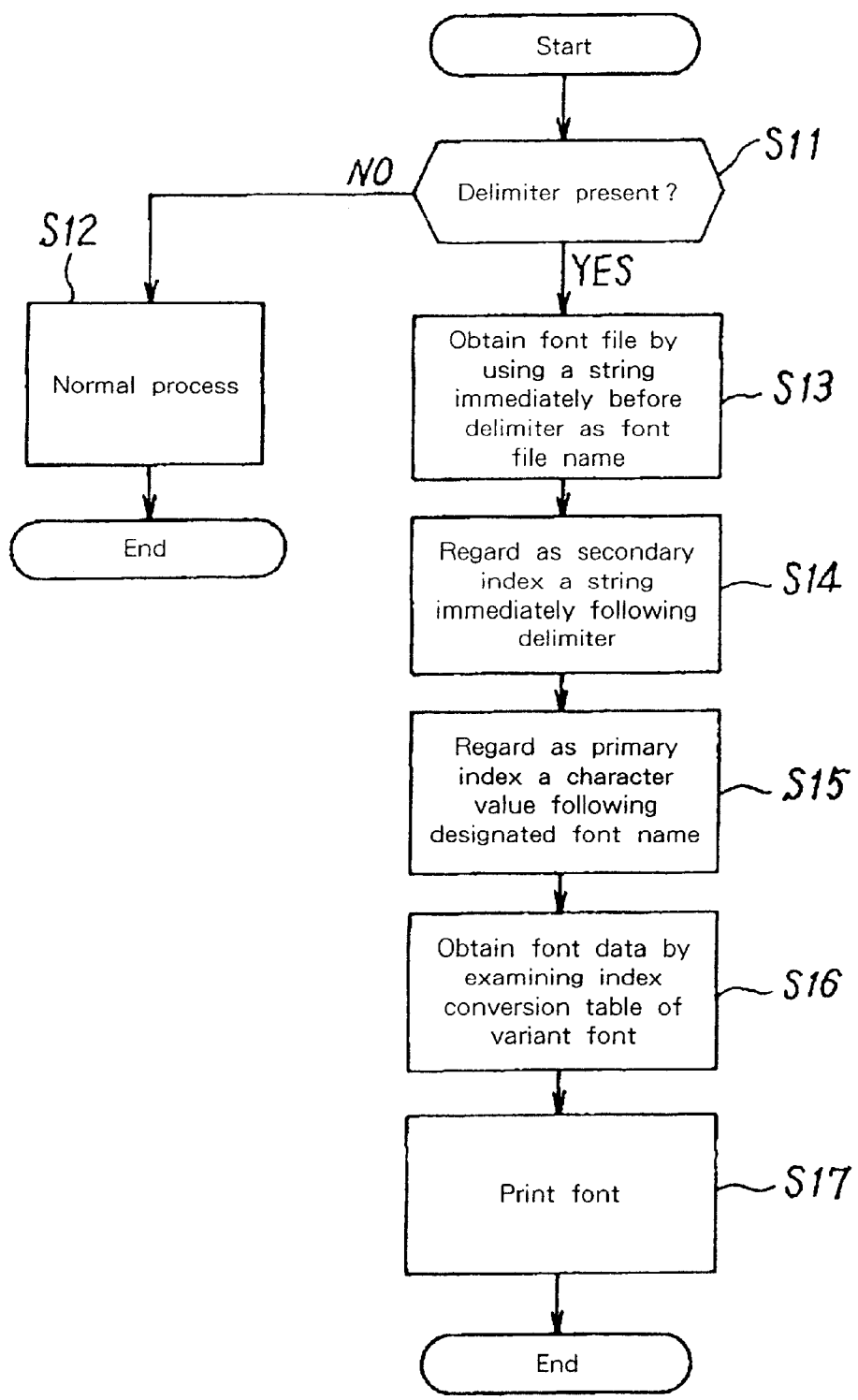
FIG. 4 is a flowchart for explaining the method used by a font driver to process a variant font.

The font driver 33 for processing a variant font will now be described while referring to flowchart in FIG. 4. First, the font driver 33 determines whether a delimiter of a variant character number is present in a designated font name (S11). When there is no delimiter, the font driver 33 returns to the normal process (S12). When a delimiter is present, the font driver 33 searches the font library that is supported by the system while a character string beginning at the head of the character immediately before the delimiter is used as the font name, and obtains a font file (S13). Further, the font driver 33 converts, into a numerical value, a character string beginning at the character immediately following the delimiter and continuing to the last character, and defines it as a variant character number. The font driver 33 uses the variant character number as the secondary index (S14), and uses, as the primary index, the font name of a designated regular character and the character code following the font name (S15). Furthermore, the font driver 33 refers to the index conversion table in the variant character font file, converts a two-dimensional index including the primary index and the secondary index, into the positional information of the font, and obtains font data (character style data) to be accessed (S16). Then, the font driver 33 displays that font on the display device (S17). The method used for referring to the index conversion table is the same as the one described above.

An explanation will now be given for the method for embedding a variant font in an electronic document, and the method for designating an electronic document in which a variant font is to be embedded. According to the present invention, variant font information, which will be described below, is used by the method of the present invention for processing an electronic document in which a variant font is included. In FIG. 3, in the control sequence for designating a font in an electronic document, the electronic document creation utility 25 designates not only the font name and the character code of a font, but also a font location that indicates whether the font is located in a local system, is embedded as an in line font in the electronic document, or is present in a remote system. When, for example, HTML or XML is used for the electronic document, the designation of the font location is performed by adding a location keyword to the <font> tag of the electronic document, and by providing LOCAL indicating the local system, IN LINE indicating the in line font, and URL (Universal Resource Locator) indicating a font file in the remote system, while using the location keyword as a value.

The system 32 for processing an electronic document in which a variant font is embedded, interprets the font location of the control sequence for designating a font in the format of a target electronic document, and determines whether the designated font is present in the local system (for the normal regular font), is an in line font embedded in the target electronic document, or is present in the remote system.

When the font is present in the local system, the system 32 prints characters in the normal process by using the same normal font as the one for the electronic document creator that is present in the system of each user.

When the designated font is an in line font, the processing system 32 decodes the embedded in line font and develops a binary image of a variant font in a temporary storage area that is obtained. The system 32 then transmits to the font driver 33 the developed font file and the font name and the character code (the character code of a regular character corresponding to the variant character) that are referred to in the electronic document, so that the variant character is printed. As the in line font defined as the media type for the MIME (Multipurpose Internet Mail Extension), a font is included in an electronic document that can be exchanged across the Internet. A conventional font format, such as TrueType or Type I, or a format indicating a compound font proposed by the present invention that consists of a plurality of fonts, can be designated a sub-media type. It is preferable that a font embedded as an in line font in an electronic document be encoded using the Base64 coding method.

When the designated font is present in the remote system, the processing system 32 refers across the Internet to the URL indicating the font resource, and copies the binary image of a variant font to a temporary storage obtained. Then, as well as for the in line font, the font file copy and the font name and the character code that are referred to in an electronic document are transmitted to the font driver 33, so that the character is printed.

In the above implementation, an electronic document has been used for which a variant font is indexed into a predetermined structure. However, when an in line font is used, a variant font can be processed without the variant font being indexed, as in the present invention.

According to the present invention, in an electronic document, a variant character is represented by using the character code of a corresponding regular character. However, since a variant font prepared by the creator of the electronic document is referred to for printing the electronic document, the variant character made by the creator can be displayed as the printed style in all the environments, character incompatibility due to the exchange of information by different systems does not occur, and data such as that for the printing style can be exchanged more accurately.

Finally, an explanation will be given for the method for searching for a character string in an electronic document in which a variant font is embedded. According to the method of the present invention for processing an electronic document in which a variant font is included, in an electronic document an indexed variant font has the same character code value as a corresponding regular character. Therefore, as a result of a search that ignores normal font information, not only a regular character but also a corresponding variant character will be hit. In many cases, when both a regular character and a variant character are found as a result of a search for a regular character, a character string desired by a user is found by using a simple search string, so that this is convenient search procedure. If a user desires to perform a search while keeping separate a regular character and a variant character, the user designates a font name in addition to character code in order to permit a search engine to search for a character string in an electronic document.

As is apparent from the above description, according to the method for font access, the method for font registration, the method for font display, the method for font printing, and the method for processing an electronic document in which a variant font is included, and a recording medium therefor, since an electronic document with an indexed variant font is processed using a predetermined method, the creator of the electronic document can use many more characters (character styles) than those to which restricted by the conventional character codes. Accordingly, the restriction on the number of characters that can be used for a registration management or a client management application for which the items managed are the names of persons and areas, or an application for the electronic documentation of the editions of classical works can be eliminated, and the names of persons and areas and the classes can be processed and stored using correct character styles. Further, information can be exchanged using an electronic document written in characters coined by a user. That is, a character having the same character style as one that is formed in the environment of a writer can be displayed in the environment of a recipient of an electronic document. Furthermore, a search can be conducted of an electronic document that uses a coined character. That is, a character string can be searched for without a regular character and a variant character being separated, or, as needed, a search of a character string can be conducted without a distinction being made between a regular character and a variant character.

Furthermore, in the implementation of the present invention for the method used for processing an electronic document in which a variant font is included, an electronic document processing system that satisfies the above requests by using conventional character code is used, so that the installation costs can be reduced.

I claim as my invention:

1. A method for managing coined oriental language characters, the method comprising:
   selecting a regular oriental character;
   coining a coined character by amending the regular oriental character with an amending oriental character;
   storing and cataloging the coined character according to a regular character value associated with the regular oriental character and an ordinal value associated with the coined character, such that multiple coined characters are catalogued under the same regular oriental character; and
   storing in a primary index table the regular character value and a pointer associated with the regular character value, the pointer pointing to an entry data in a secondary index, the entry data including a pointer to a target character stored in a character data file, the entry data also including a second value, the second value being such that:
      if the second value is the same as the ordinal, then the target character is the coined character;
      if the second value is not the same as the ordinal value, then the second value is used to point to a next entry data catalogued under the same regular oriental character, the next entry data pointing to another next entry data until an entry data having a second value that is the same as the ordinal is located, wherein the target character is the coined character; and
      if the second value is null, then the target character is the regular oriental character.

2. The method of claim 1, further comprising:
   determining that a requested character is a coined character that is different from a regular oriental character by the presence of a delimiter.

3. The method of claim 2, further comprising:
   returning an error message if the second value is null.

4. The method of claim 2, wherein the delimiter is found in a header of a request for a character.

5. The method of claim 1, further comprising retrieving the coined character by pointing to the target character.

6. A system for managing coined oriental language characters, the system comprising:
   means for selecting a regular oriental character;
   means for coining a coined character by amending the regular oriental character with an amending oriental character;
   means for storing and cataloging the coined character according to a regular character value associated with the regular oriental character and an ordinal value associated with the coined character, such that multiple coined characters are catalogued under the same regular oriental character; and
   means for storing in a primary index table the regular character value and a pointer associated with the regular character value, the pointer pointing to an entry data in a secondary index, the entry data including a pointer to a target character stored in a character data file, the entry data also including a second value, the second value being such that:
      if the second value is the same as the ordinal, then the target character is the coined character;
      if the second value is not the same as the ordinal value, then the second value is used to point to a next entry data catalogued under the same regular oriental character, the next entry data pointing to another next entry data until an entry data having a second value that is the same as the ordinal is located, wherein the target character is the coined character; and
      if the second value is null, then the target character is the regular oriental character.

7. The system of claim 6, further comprising:
   means for determining that a requested character is a coined character that is different from a regular oriental character by the presence of a delimiter.

8. The system of claim 7, further comprising:
   for returning an error message if the second value is null.

9. The system of claim 7, wherein the delimiter is found in a header of a request for a character.

10. The system of claim 6, further comprising means for retrieving the coined character by pointing to the target character.

11. A computer program product, residing on a computer usable medium, for managing coined oriental language characters, the computer program product comprising:
    program code for selecting a regular oriental character;
    program code for coining a coined character by amending the regular oriental character with an amending oriental character;
    program code for storing and cataloging the coined character according to a regular character value associated with the regular oriental character and an ordinal value associated with the coined character, such that multiple coined characters are catalogued under the same regular oriental character; and program code for storing in a primary index table the regular character value and a pointer associated with the regular character value, the pointer pointing to an entry data in a secondary index, the entry data including a pointer to a target character stored in a character data file, the entry data also including a second value, the second value being such that:

if the second value is the same as the ordinal, then the target character is the coined character;

if the second value is not the same as the ordinal value, then the second value is used to point to a next entry data catalogued under the same regular oriental character, the next entry data pointing to another next entry data until an entry data having a second value that is the same as the ordinal is located, wherein the target character is the coined character; and if the second value is null, then the target character is the regular oriental character.

12. The computer program product of claim 11, further comprising:

program code for determining that a requested character is a coined character that is different from a regular oriental character by the presence of a delimiter.

13. The computer program product of claim 12, further comprising:

program code for returning an error message if the second value is null.

14. The computer program product of claim 12, wherein the delimiter is found in a header of a request for a character.

15. The computer program product of claim 11, further comprising:

program code for retrieving the coined character by pointing to the target character.

* * * * *